May 15, 1956    A. L. LADD ET AL    2,745,193
DRIER
Filed Nov. 17, 1954
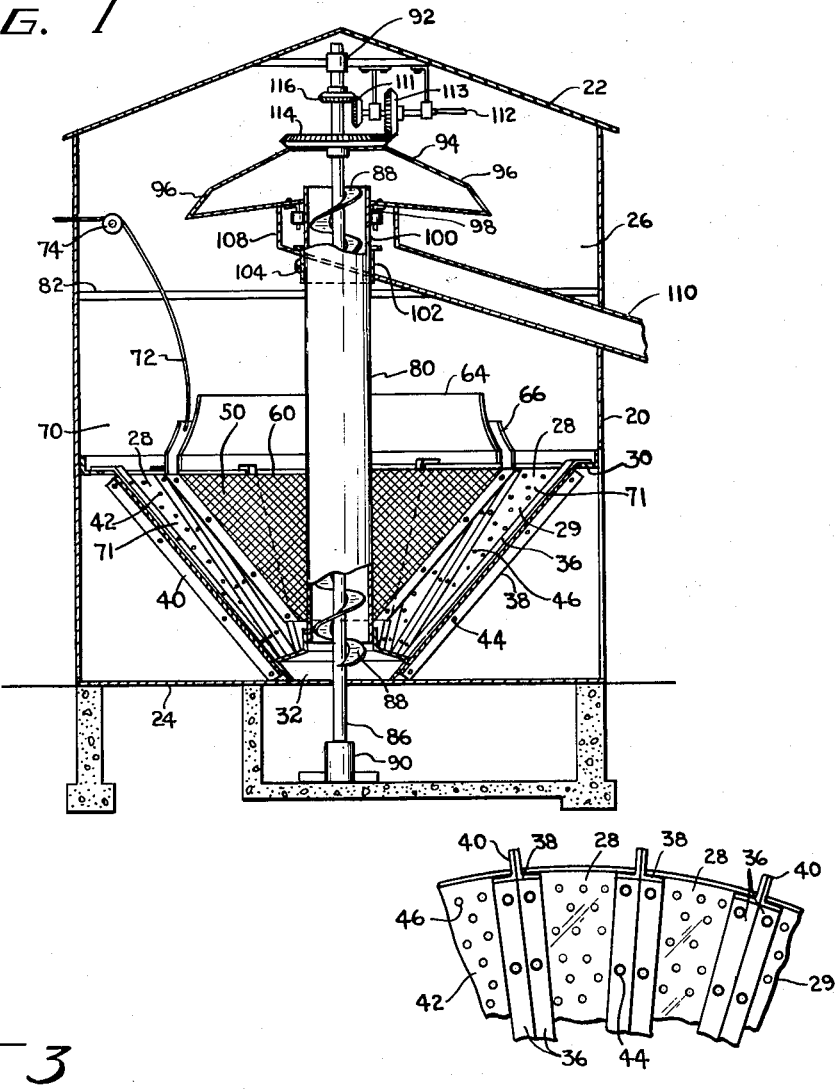
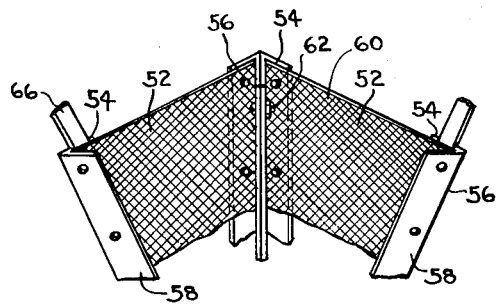
INVENTOR.
ALLAN L. LADD
MELVIN L. SPECKMAN
BY John L. Woodward
ATTORNEY United States Patent Office 2,745,193
Patented May 15, 1956

2,745,193

DRIER

Allan L. Ladd and Melvin L. Speckman,
Sleepy Eye, Minn.

Application November 17, 1954, Serial No. 469,476

6 Claims. (Cl. 34—102)

This invention relates to a drier apparatus of the type wherein the same loose bulk material is continuously fed in the same predetermined cycle to a heated medium until it is dried to a desired moisture content. The invention is an improvement of the drier disclosed in Patent No. 2,634,513, issued April 14, 1953.

The drier apparatus consists of a vertically extending chamber provided with a demountable sloping floor formed completely around its lower portion for feeding material to be dried to a screw conveyor means mounted in a vertically extending tubular member positioned in the center of the chamber. The sloping floor is provided with a plurality of spaced apertures throughout its surface whereby heated air may be supplied to the chamber for drying the material therein. The screw conveyor lifts the material to adjacent the top of the chamber and delivers the material to a rotating housing or distributor having a plurality of outlet ducts mounted on the shaft of the conveyor which feeds the material being dried such as loose bulk corn, wheat, oats or grass seeds to the wall of the chamber. Then the bulk corn etc. is again fed by gravity to the lower end of the screw conveyor means which again elevates the loose bulk corn to the rotary housing in the top of the chamber. The loose bulk corn or the like is recirculated in the drier until it is dried to a desired moisture content, then a sleeve slidably mounted on the upper end of the tubular member is moved below the rotary housing communicating aperture means in the tubular member with outlet means for the chamber. Means are provided for driving the rotary housing at a different speed than the speed of the conveyor so that the material being dried in the chamber is fed without too much force to the wall of the chamber. An adjustable control means is mounted above the sloping floor in the chamber for maintaining a uniform depth of grain over the entire area of the apertured floor so that all the grain on the floor can be uniformly dried.

It is an object of this invention to provide in a drier apparatus for drying bulk corn and other bulk seed grains, means for operating a rotating housing scattering means at a different rate of speed than a screw conveyor means whereby the material being circulated by the conveyor in the drier is not thrown with too much force against the walls of the chamber.

It is another object of this invention to provide in a drier apparatus, a chamber having a relatively steep sloping floor for feeding with facility bulk corn, oats, wheat or grass seed to the lower end of a screw conveyor means which circulates the material being dried over a heated medium until dried to a desired moisture content, of an adjustable flow control means for regulating the flow of material to the lower end of the screw conveyor so that a uniform depth grain is always maintained on the sloping floor to insure uniform drying.

It is a still further object of this invention to provide in a drier apparatus for loose bulk corn and other bulk grain seeds, means for continuously circulating the same grain over heated air until dried to a desired moisture content, of a sloping floor in the lower end of the chamber of the drier formed of a plurality of sections which are demountably fastened together and of a flow control means for the grain formed of a plurality of sections which are demountably fastened together.

Other and further objects of the invention will become apparent from the detailed description and the appended claims.

In the drawings:
Figure 1 is a vertical sectional view of the drier.
Figure 2 is a fragmentary view of the floor of the drier, disclosing several sections secured together.
Figure 3 is a fragmentary view of the flow control means for the grain, disclosing two sections thereof.

Referring in detail to the drawing 20 is a casing of cylindrical shape made of metal and/or other suitable materials. A roof 22 covers the top of the housing 20 and a floor 24 of metal or the like closes the bottom of the housing 20.

The casing 20 is provided with a chamber 26, the upper portion of which is cylindrically shaped. A plurality of V-shaped metal plates 28 are loosely supported on a circumferentially extending ring of angle iron 30 secured to adjacent the intermediate portion of the wall of housing 20, with the large end of the plates resting on the ring 30 and with the small end of plates 28 abutting the edge of a small cup area 32 on the bottom 24 of chamber 26. The opposite edge of each plate 28 is soldered or otherwise fastened to one leg 36 of a pair of spaced angle irons 38. The other leg 40 of each of the angle irons 38 depends or extends downwardly below the upper face 42 of the sloping floor 29. The depending leg 40 of the two spaced angle irons of each plate 28 is secured by bolt and nut means 44 to the next abutting depending leg 40 of the angle iron 38 of the plate 28 on each side thereof throughout the entire sloping or inverted cone-shaped floor 29. Where the sections or plates 28 are secured together by removable bolt and nut means 44 on the underside of the floor 29, the floor 29 can be readily mounted and demounted in the chamber 26. Each of the plates 28 is provided with a plurality of spaced apart apertures 46 through which heated air is applied to the chamber 26.

A grain flow control means 50 is adapted to be spaced above the sloping floor 29 in chamber 26. The flow control means 50 comprises a plurality of V-shaped sections of wire screening 52. The opposite edge of each of the sections 52 is secured to one leg 54 of a pair of spaced angle irons 56 which taper to point at one end. The other leg 58 of each of the angle irons 56 extends upwardly on the top side 60 of the flow control means 50. The upwardly extending leg 58 of the two spaced angle irons 56 of each section 52 of the flow control means 50 is secured together by bolt and nut means 62 to the next abutting upstanding leg 58 of the angle iron 56 of the section 52 on each side thereof throughout the entire flow control means 50. Where the sections 52 are secured together by removable bolt and nut means 62 on the top surface of the flow control means 50, the flow control means 50 can be readily assembled and disassembled in the chamber 26. The flow control means 50 is inverted cone-shaped. A circular metal plate 64 preferably formed in sections is removably secured by bolt and nut means to flange members 66 extending from the upper end of angle irons 56. The flanges 66 are bent inwardly over the sections 52 to provide a circumferential space 70 in the chamber 26 for a purpose to be set out hereinafter. A cord 72 passes over a roller 74 and extends to the outside of chamber 26. The cord 72 is for adjusting the position of the flow control means 50 with respect to the floor 29.

A tubular member 80 is positioned in the center of chamber 26 and extends vertically from adjacent the center of floor 24 to adjacent the lower edge of the roof 22. Lateral braces 82 positioned between the wall of chamber 26 and the pipe 80 adjacent its upper end maintain the pipe 80 in the center of the chamber 26.

Disposed centrally and longitudinally through the tubular member 80 is a shaft 86. Carried by shaft 86 is a continuous spiral screw conveyor 88. The shaft 86 extends through the bottom of the floor 24 and is journalled in a bearing at at 90. The upper end of shaft 86 is mounted in a bearing 92 adjacent the inside of roof 22.

A housing member or distributor 94 provided with a pair of outlet spouts 96 spaced diametrically opposite each other is loosely mounted on the upper end of shaft 86. The lower edge of the housing 94 is provided with an opening 98 by which the upper end of the tubular member 80 extends into the housing or rotary scattering means 94.

A plurality of spaced apertures 100 are formed in the tubular member 80 adjacent its upper end. A slidable sleeve 102 is mounted on the outside of the tubular member 80 adjacent the upper end of pipe 80. The sleeve 102 is capable of being adjusted on the pipe 80 for a purpose hereinafter set forth. A set screw 104 holds the sleeve 102 in its different adjusted positions on the tubular member 80. A receiving means 108 surrounds the pipe 80 below its upper end and communicates with an outlet duct 110. The receiving means 108 is appropriately secured to the sleeve 102. The upper end of pipe 80 may be cut off communicating the pipe 80 with outlet 110 when the sleeve 104 is in its lowered position. Elevating the sleeve 102 communicates pipe 80 with the distributor 94. A crank device having its handle on the outside of the housing 20 may be employed for adjusting the sleeve 102.

An electric motor or other means (not shown) actuates shaft 112. A gear 113 on an intermediate portion of shaft 112 meshes with a ring gear 114 secured to the top of the scattering means 94. A second gear on the outer end of shaft 112 meshes with a gear 116 fixedly mounted on shaft 86 for the conveyor 88. Gear 116 is smaller than gear 114. The speed of the conveyor 88 may be from four to ten times faster than the speed of the scattering device 94.

We use a relatively steep sloping floor 29 so that our drier will readily dry bulk corn, oats or grass seed. It takes a steeper floor to feed materials like grass seed to the lower end of the conveyor 88 than it does for materials like corn, so we use the type of floor which will readily feed grass seed and corn to the lower end of the conveyor 88. It has been found that because of the different rates of flow of different materials on the same sloped floor that a means for controlling the depth of the material over the entire area of the floor is necessary to maintain a uniform depth for all materials over the entire floor and such controlling means for controlling the depth of the material on the floor should be adjustable so that different depths of material can be maintained on the sloping floor. We use the flow control means 50 for maintaining a uniform depth of materials over the entire area of the sloping floor 29. The inverted cone-shaped flow control means 50 being always spaced above the floor 29 permits grain to flow from space 70 to space 71 between the flow control means 50 and floor 29. If it is desired that more grain or a greater depth of grain flow over the floor to the lower end of the screw conveyor 88, then the cord 72 elevates the flow control means 50 upwards from the floor 29 thus enlarging the area of space 71. Conversely lowering the flow control means 50 closer to the floor 29 reduces the amount or the depth of grain flowing over the floor 29 and being fed to the lower end of the screw conveyor 88. Space 70 assures an ample supply of grain for flowing into space 71. Regardless of the position of the flow control means 50 with respect to the floor, a uniform depth of grain is maintained over all of the floor from its top to the lower end of the screw conveyor 88.

It is possible to employ an adjustable means such as the inverted cone-shaped means 50 positioned above the floor 29 for controlling or maintaining a uniform depth of material over the entire area of the drying floor or the slope of the drying floor may be adjusted or varied with respect to means positioned above the floor to maintain uniform depth of material over the floor or a combination of these two means may be utilized for maintaining a uniform depth of material flowing over the floor.

When it is desired that the grain be circulated in the chamber 26, sleeve 102 is raised on tubular member 80 until aperture means 100 in pipe 80 are closed. Then the grain is flowed to the rotary scattering housing 94 and through spouts 96 to the chamber 26. If grain is to be fed to the outside of chamber 26, then sleeve 102 is positioned on pipe 80 below the aperture means 100 in pipe 80 and the grain is fed by the conveyor 88 through aperture 100 in pipe 80 to receive means 108 and outlet duct 110.

The scattering means 94 is operated at a different speed than the conveyor 88 so that the seed grains are not thrown too hard to the wall of the chamber 26. It has been found that if the scattering means 94 is operated at the speed which is necessary for the conveyor 88 to feed an adequate amount of grain to the scattering means 94 that the grain would be tossed too hard to the wall of the chamber 26 by the scattering means 94 thus injuring the seed corn.

It is to be understood that other changes in size, proportion and arrangement of the elements may be resorted to but all such changes are deemed to fall within the spirit of the invention and the scope of the appended claims.

What we claim as new is:

1. In a drier apparatus comprising a chamber, a sloping floor extending around the entire lower portion of the chamber provided with a plurality of spaced apart apertures, the floor sloping toward the center of the lower end of the chamber forming a relatively small pocket at the bottom of said chamber, a pipe positioned in the chamber extending from adjacent the pocket at the lower end of the chamber to adjacent the top of said chamber, a conveyor means including a shaft positioned in the pipe extending from the bottom of the chamber to the top of the pipe, a rotary housing having spaced apart outlet means mounted adjacent the upper end of the shaft, the lower end of housing positioned below the upper end of the pipe whereby the pipe extends into the housing, and means for actuating the housing at one speed and the conveyor at a second speed.

2. In a drier apparatus comprising a chamber, a sloping floor extending around the entire lower portion of the chamber provided with a plurality of spaced apart apertures, the floor sloping toward the center of the lower end of the chamber forming a relatively small pocket at the bottom of said chamber, a pipe positioned in the chamber extending from adjacent the pocket at the lower end of the chamber to adjacent the top of said chamber, a conveyor means including a shaft positioned in the pipe extending from the bottom of the chamber to the top of the pipe, a rotary housing having spaced apart outlet means mounted adjacent the upper end of the shaft, the lower end of housing positioned below the upper end of the pipe whereby the pipe extends into the housing and means for actuating the housing at one speed and the conveyor at a second speed, the said one speed of the housing being different than the speed of the conveyor.

3. In a drier apparatus comprising a chamber, a sloping floor extending around the entire lower portion of the chamber provided with a plurality of spaced apart apertures, the floor sloping toward the center of the lower end of the chamber forming a relatively small pocket at the bottom of said chamber, a pipe positioned in the chamber extending from adjacent the pocket at the lower end of the chamber to adjacent the top of said chamber, a conveyor means including a shaft positioned in the pipe extending from the bottom of the chamber to the top of the pipe, a rotary housing having spaced apart outlet means mounted adjacent the upper end of the shaft, the lower end of housing positioned below the upper end of the pipe whereby the pipe extends into the housing, and means for actuating the housing at one speed and the conveyor at a second speed, the speed of the conveyor being at least four times greater than the speed of the housing.

4. In a drier apparatus comprising a chamber, a sloping floor extending around the entire lower portion of the chamber provided with a plurality of spaced apart apertures, the floor sloping toward the center of the lower end of the chamber forming a relatively small pocket at the bottom of said chamber, a pipe positioned in the chamber extending from adjacent the pocket at the lower end of the chamber to adjacent thte top of said chamber, a conveyor means including a shaft positioned in the pipe extending from the bottom of the chamber to the top of the pipe, a rotary housing having spaced apart outlet means mounted adjacent the upper end of the shaft, the lower end of housing positioned below the upper end of the pipe whereby the pipe extends into the housing, a means for actuating the housing at one speed and the conveyor at a second speed, the said sloping floor comprising a plurality of demountable sections, each section of the floor having its opposite edges each secured to one leg of a pair of spaced angle irons, the other leg of the said pair of angle irons for each section removably secured by bolt and nut means to the said other leg of both of the abutting floor sections throughout the entire floor.

5. In a drier apparatus comprising a chamber, a sloping floor extending around the entire lower portion of the chamber provided with a plurality of spaced apart apertures, the floor sloping toward the center of the lower end of the chamber forming a relatively small pocket at the bottom of said chamber, a pipe positioned in the chamber extending from adjacent the pocket at the lower end of the chamber to adjacent the top of said chamber, a conveyor means including a shaft positioned in the pipe extending from the bottom of the chamber to the top of the pipe, a rotary housing having spaced apart outlet means mounted adjacent the upper end of the shaft, the lower end of housing positioned below the upper end of the pipe whereby the pipe extends into the housing, and means for actuating the housing at one speed and the conveyor at a second speed, a flow regulating means mounted inside the chamber spaced above the floor, and means for adjusting the position of the flow regulating means with respect to the floor for varying the depth of material on the floor flowing to the lower end of the conveyor means.

6. In a drier apparatus comprising a chamber, a sloping floor extending around the entire lower portion of the chamber provided with a plurality of spaced apart apertures, the floor sloping toward the center of the lower end of the chamber forming a relatively small pocket at the bottom of said chamber, a pipe positioned in the chamber extending from adjacent the pocket at the lower end of the chamber to adjacent the top of said chamber, a conveyor means including a shaft positioned in the pipe extending from the bottom of the chamber to the top of the pipe, a rotary housing having spaced apart outlet means mounted adjacent the upper end of the shaft, the lower end of housing positioned below the upper end of the pipe whereby the pipe extends into the housing, and means for actuating the housing at one speed and the conveyor at a second speed, a flow regulating means mounted inside the chamber spaced above the floor, and means for adjusting the position of the flow regulating means with respect to the floor for varying the depth of material on the floor, the flow regulating means comprising a plurality of demountable sections.

References Cited in the file of this patent

UNITED STATES PATENTS

| | | |
|---|---|---|
| 2,207,360 | Spellacy | July 9, 1940 |
| 2,388,399 | Forster et al. | Nov. 6, 1945 |
| 2,634,513 | Ladd et al. | Apr. 14, 1953 |

FOREIGN PATENTS

| | | |
|---|---|---|
| 11,946 | Great Britain | 1893 |